(12) United States Patent
Marsh et al.

(10) Patent No.: US 7,756,321 B2
(45) Date of Patent: Jul. 13, 2010

(54) METHOD FOR FITTING PART ASSEMBLIES

(75) Inventors: Bobby J. Marsh, Lake Stevens, WA (US); Thomas Vanderwiel, Everett, WA (US); Kinson VanScotter, Stanwood, WA (US); Michael Thompson, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 806 days.

(21) Appl. No.: 11/712,058

(22) Filed: Feb. 28, 2007

(65) Prior Publication Data

US 2008/0205763 A1    Aug. 28, 2008

(51) Int. Cl.
*G06K 9/00* (2006.01)
*G06K 9/46* (2006.01)
*G06T 7/60* (2006.01)
*G01B 11/02* (2006.01)
*G06T 17/00* (2006.01)

(52) U.S. Cl. ............... 382/152; 382/154; 382/190; 382/286; 700/98; 700/118; 700/195; 702/159; 702/167; 702/172; 356/625; 356/394

(58) Field of Classification Search ............. 382/141, 382/151, 152, 154, 190, 286; 700/95, 97, 700/98, 117, 118, 159, 195; 702/155, 156, 702/158, 159, 167, 170, 172; 356/601, 625, 356/626, 627, 628, 629, 630, 634, 388, 394
See application file for complete search history.

(56) References Cited

U.S. PATENT DOCUMENTS

| | | | |
|---|---|---|---|
| 5,106,290 A * | 4/1992 | Carver et al. | 425/470 |
| 6,618,505 B2 | 9/2003 | Cork et al. | |
| 7,565,216 B2 * | 7/2009 | Soucy | 700/98 |
| 2002/0123812 A1 * | 9/2002 | Jayaram et al. | 700/98 |
| 2004/0120568 A1 * | 6/2004 | Kidd et al. | 382/141 |
| 2008/0223985 A1 * | 9/2008 | Marsh et al. | 244/119 |

FOREIGN PATENT DOCUMENTS

WO  PCT/US2008/051426    1/2008

* cited by examiner

*Primary Examiner*—Jon Chang
(74) *Attorney, Agent, or Firm*—Tung & Associates

(57) ABSTRACT

Shims used to join part assemblies are automatically designed and fabricated without the need for fitting part assemblies together in order to determine the exact dimensions of voids filled by the shims. The locations of key features on part assemblies are surveyed using a merged photogrammetry and laser tracking technique that generate the dimensions of a virtual shim. The dimensions of the virtual shim are contained in a digital file that can be used to automatically fabricate the shim using automated fabrication equipment such as a CNC machining center. The automated virtual shim design may be modified to reflect the effect of part assembly fit on performance characteristics of the aircraft.

30 Claims, 9 Drawing Sheets

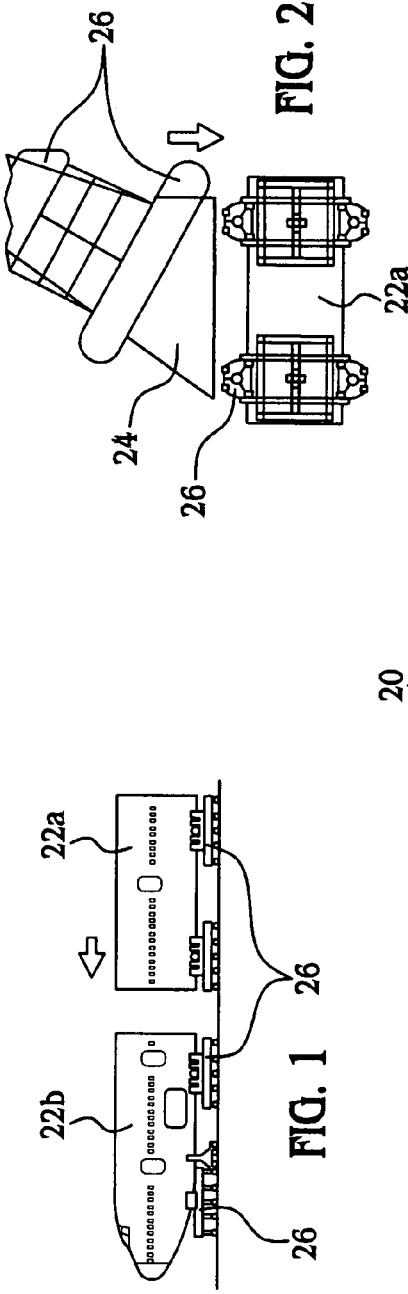
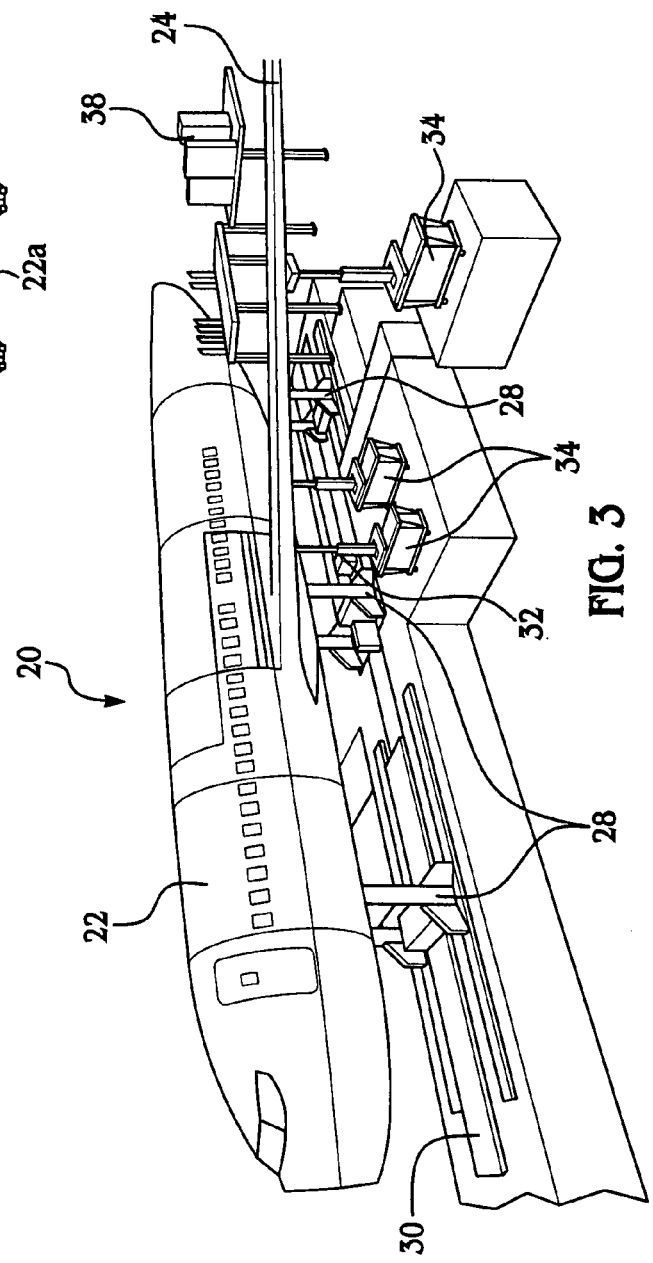

METHOD FOR FITTING PART ASSEMBLIES

TECHNICAL FIELD

This disclosure generally relates to manufacturing processes used to join parts, and deals more particularly with a method for fitting, aligning and joining large, complex part assemblies.

BACKGROUND

Shims are commonly used in fitting and assembling parts and subassemblies in order to compensate for dimensional variations. In the aircraft industry, shims are used extensively in fitting and joining fuselage sections, and in attaching wings and tail assemblies (vertical fin and horizontal stabilizer assemblies) to the fuselage. The shims, sometimes referred to as fillers, are used to fill voids between the joined assemblies which may be caused by tolerance build up in parts. The use of shims to fill voids between mating surfaces on part assemblies results in a more structurally sound aircraft. Shims are also used to bring parts into proper alignment.

Design and fabrication of unique shims for each aircraft can be a time consuming and labor intensive process. A skilled technician must manually measure and record each void in order to determine the dimensions and shape of a particular shim that will fill the void. The recorded dimensions are then sent to a machine shop where the shim is fabricated.

The shim design and installation process described above may materially slow down aircraft assembly, especially where the assemblies are manufactured in different geographic locations and are shipped to a final assembly location. This is due, in part, to the fact that the shims cannot be designed and manufactured until the assemblies are fitted together at the final assembly destination so that the size and shape of the voids can be determined.

Efforts have been made to reduce the time required for determining shim dimensions as exemplified in U.S. Pat. No. 6,618,505 issued Sep. 9, 2003 and assigned to the Boeing Company. This prior patent discloses a method and apparatus for determining the dimension of a shim, using digital photogrammetry to measure the profile of the voids requiring shims. The shim dimensions are calculated based on the void profile measurements referenced against an engineering standard defining an ideal fit between the assemblies. While this prior process reduces the time required for shim design, further efficiency improvements are possible.

Accordingly, a need exists for a method for fitting and joining part assemblies in which the shims are automatically designed and fabricated without the need for physically fitting the part assemblies to determine the location and profile of potential voids. Embodiments of the disclosure are directed towards satisfying this need.

SUMMARY

Illustrated embodiments of the disclosure provide a method of automatically designing and fabricating shims without the need for joining part assemblies in order to determine the exact dimensions of voids filled by the shims. The locations of key features on part assemblies are surveyed using a merged photogrammetry and laser tracking technique that generate the dimensions of a virtual shim. The dimensions of the virtual shim are contained in a digital file that can be used to automatically fabricate the shim using automated fabrication equipment such as a CNC machining center. The automated virtual shim design may be modified to reflect the effect of part assembly fit on performance characteristics of the aircraft. For example, the virtual shim dimensions can be adjusted to alter the incidence, sweep, or dihedral of wings relative to a fuselage.

According to one embodiment of the disclosure, a method is provided for fitting two parts together, comprising the steps of: measuring the location of a first set of features on a first part; measuring the location of a second set of features on a second part; generating a virtual fit between the first and second parts based on the location measurements; and, generating dimensions of shims to be positioned between the first and second parts based on the generated virtual fit. Feature location measurement may be performed using both laser tracker and photogrammetry processes. Generating the virtual fit may include performing a virtual nominal fit and then optimizing the virtual nominal fit. The virtual fit may also include generating computer models of the first and second parts and then comparing the computer models to determine the shape of voids requiring shims.

According to another embodiment, a method is provided for producing shims used in fitting aircraft part assemblies together. The method includes the steps of: generating first and second sets of data respectively representing the location of features on first and second part assemblies; performing a virtual fit between the first and second part assemblies using the first and second sets of data; analyzing characteristics of the aircraft based on the virtual fit; modifying the virtual fit based on the results of the analysis; generating the dimensions of at least one shim based on the modified virtual fit; and, fabricating the shim using the generated dimensions. One of the part assemblies may comprise a wing and the analyzed characteristics may include one or more of the angle of incidence of the wing, the sweep angle of the wing or the dihedral of the wing. The generated dimensions of the shim may include generating a set of digital data representing the dimensions, and the fabricating step may include using the digital data set to control a machine used to fabricate the shim. Performing the virtual fit may include providing a set of data representing a nominal fit between the first and second part assemblies, including key geometric features, and aligning the key geometric features of the first and second part assemblies. The virtual fit may also include aligning certain features in a first set of features on the first and second part assemblies, and then performing a best fit between features in a second set of features on the first and second part assemblies.

In accordance with still another embodiment, a method is provided for manufacturing an aircraft comprising the steps of: manufacturing a first part assembly; generating a first set of data representing the position of features on the first part assembly; manufacturing a second part assembly; generating a second set of data representing the position of features on the second part assembly; performing a virtual fit between the first and second part assemblies using the first and second sets of data; generating the dimensions of shims used to fit the first and second part assemblies together based on the virtual fit; fabricating shims based on the generated dimensions; and, assembling the first and second part assemblies using the fabricated shims. The first and second part assemblies may be manufactured respectively in first and second geographic locations, and the final assembly step may be performed in a third geographic location. The method may further include the steps of analyzing characteristics of the aircraft based on the virtual fit and then modifying the virtual fit based on the results of the analysis. The step of performing the virtual fit may include aligning the features in a first set of features on the first and second part assemblies, and performing a best fit between features in a second set of features on the first and second part assemblies.

In accordance with still another embodiment of the disclosure, a method is provided for manufacturing an aircraft, comprising the steps of: fabricating a first part assembly in a first manufacturing process; generating a first set of data representing the position of features on the first part assembly; fabricating a second part assembly in a second manufacturing process; generating a second set of data representing the position of features on the second part assembly; performing a virtual fit between the first and second part assemblies using the first and second sets of data; analyzing characteristics of the aircraft based on the virtual fit; modifying the virtual fit based on the results of the analysis; and, altering at least one of the first and second manufacturing processes based on the results of the modified virtual fit. The first and second part assemblies may be manufactured in differing geographic regions.

Other features, benefits and advantages of the disclosed embodiments will become apparent from the following description of embodiments, when viewed in accordance with the attached drawings and appended claims.

BRIEF DESCRIPTION OF THE ILLUSTRATIONS

FIG. 1 is a side view illustration of two aircraft fuselage sections being fitted together.

FIG. 2 is a plan view illustration of a wing assembly being fitted to a section of the fuselage shown in FIG. 1.

FIG. 3 is a perspective illustration showing a wing assembly being fitted to a fuselage.

DETAILED DESCRIPTION

Figure 4:
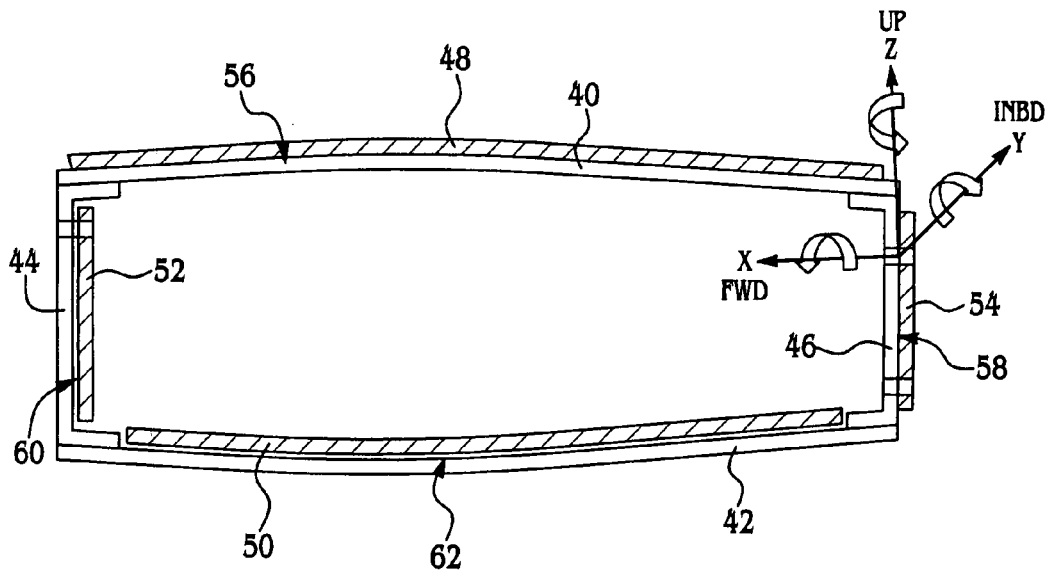
FIG. 4 is a diagrammatic illustration showing in cross section, the major components joined between the wing assembly and fuselage shown in FIG. 3.
Figure 5:
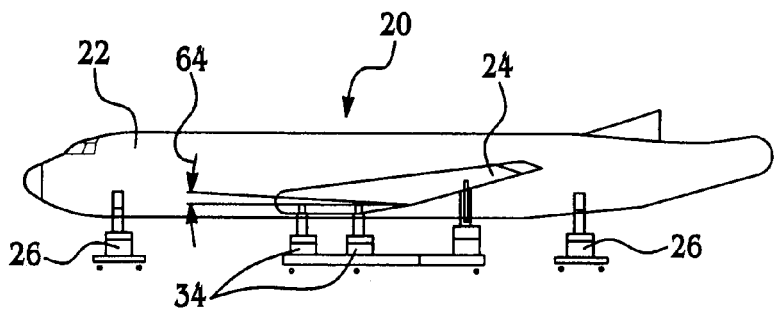
FIG. 5 is a side view illustration of an aircraft showing potential adjustments in the angle of wing incidence using shims.

Referring first to FIGS. 1-3, embodiments of the disclosure relate to a method and manufacturing process for fitting and attaching parts, or assemblies of parts. As used herein the term "parts" or "part assemblies" is intended to include a wide range of structures and components that are to be fitted and or joined together, and may comprise individual parts, assemblies of parts or subassemblies. The method is particularly useful in fitting relatively large complex parts or part assemblies in which gaps or voids may be present between the assembled parts that require the use of shims to fill these voids. In the illustrated embodiments, the parts comprise large assemblies used in constructing aircraft, however it is to be understood that the method and process may be employed and fitting various other types of part assemblies for a wide range of applications.

Commercial aircraft 20 are typically manufactured by assembling large, modular sections. In FIG. 1, two fuselage sections 22a, 22b carried on wheel lift systems 26 are moved into end-to-end contact and are joined together using various types of fasteners and connections. This joining and attachment process includes the need to fit certain mating parts of the two fuselage sections 22a, 22b together. Because of accumulated or "stacked" tolerances in the parts forming each of the fuselage sections 22a, 22b, mating portions of the sections 22a, 22b may not be perfectly fitted, resulting in gaps or voids between the two mating surfaces. These voids must be filled with later discussed shims in order to assure that the two sections 22a, 22b have sufficient structural integrity at the joints between them.

As shown in FIG. 2, a starboard wing assembly 24 supported on wheel lifts 26 is moved into position for attachment to one of the fuselage sections 22a. FIG. 3 also shows the wing assembly 24 having been moved into position relative to the fuselage 22, ready for attachment. The fuselage 22 is supported on body cradles 28 that are moveable along a production line track 30. The wing assembly 24 is supported on positioners 34 which are capable of adjusting the position of the wing assembly 24 along X (fore and aft), Y (inboard-outboard) and Z (up and down) directions so that the wing assembly 24 is properly positioned when the attachment process is completed. A laser tracker 22 or similar non-contact measuring device is used to assess the position of key reference points on the wing assembly 24 and the fuselage 22 during the final fitting process. A computer based controller 38 may receive measurement data collected by the laser tracker 22 and is operative to control the positioners 34 during the final fitting process.

Although not specifically shown in the drawings, the vertical fin and horizontal stabilizers (not shown) are fitted and attached to the fuselage 22 in a manner similar to that of the wing assembly 24.

The wing assembly 24 is attached to the fuselage 22 by laterally extending mating components of the wing assembly 24 and the fuselage 22. These mating components, which must be fitted together in a desired alignment, are diagrammatically shown in FIG. 4. Laterally extending components of the fuselage 22 referred to as "stub" components are shown in cross hatch. The stub components of the wing assembly include an upper flange 48, lower flange 50, forward spar terminal fitting 52 and rear spar terminal fitting 54. These stub components respectively mate with wing components comprising an upper wing panel 40, lower wing panel 42, wing forward spar 44 and wing rear spar 46.

The accumulated tolerances in the mating components discussed immediately above are such that gaps between these two sets of components may be present. These gaps allow slight movement or adjustment of the wing assembly 24 relative to the fuselage 22 along any of three axes: X (fore and aft), Y (inboard-outboard) and Z (up and down). In the embodiment shown in FIG. 4, a gap 60 is present between the wing forward spar 44 and the forward spar terminal fitting 52. Similarly, a gap 62 is present between the lower flange 50 and the lower wing panel 42. These two gaps 60, 62 require the introduction of shims in order to fill the gaps and fix the final position of the wing assembly 24 relative to the fuselage 22.

Referring now to FIGS. 5-8, the angle of incidence 64 of the wing assembly 24 depends on the fit between the components of the fuselage 22 and wing assembly 24 discussed earlier with reference to FIG. 4. The angle of incidence 64 may be adjusted during the final fitting and attachment process using shims 72 to fill the gaps. The exact dimensions and shape of the shims 72 are determined according to a method that will be discussed later below, however for purposes of this description, a flat, rectangularly shaped shim 72 (FIG. 8) is shown.

Figure 6:
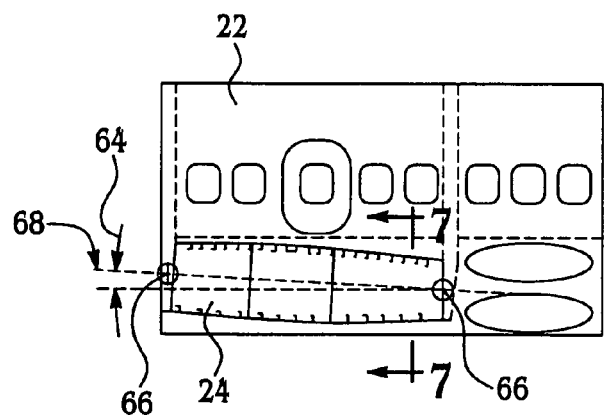
FIG. 6 is a side view illustration of a section of the fuselage showing key reference points used to adjust the angle of incidence of the wing shown in FIG. 5.
Figure 7:
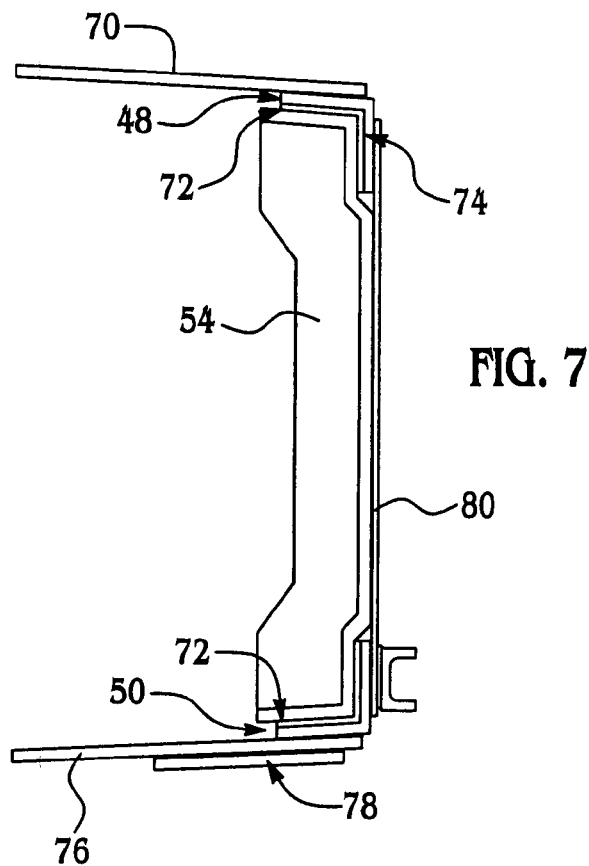
FIG. 7 is a sectional view taken along the line 7-7 in FIG. 6.
Figure 8:
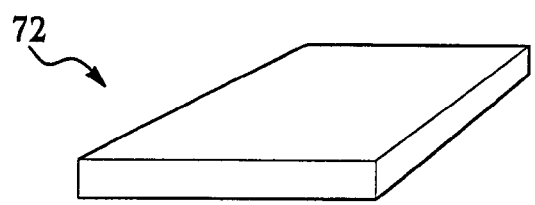
FIG. 8 is a perspective illustration of a typical shim.

Adjusting the angle of incidence 64 of the wing assembly 24 is carried out using measurements of the positions of reference points, such as the two reference points 66 shown in FIG. 6. A line connecting the reference points 66 forms an angle relative to horizontal equal to that of the angle of incidence 64. The relative position of the reference points may be measured using a variety of techniques, however will be discussed later, laser tracking and/or photogrammetry techniques are particularly useful in performing these measurements. The upper and lower ends of the rear spar terminal fitting 54 are received within upper rear and lower rear cords 48, 50 respectively. Upper and lower stub panels 70, 76 are respectively connected to cords 48, 50. A splice plate 78 covers a splice in the stub lower panel 76. The backside of the rear spar terminal fitting 54 is secured to a stub rear spar web 80.

The shims 72 fill gaps between the cords 48, 50 and the rear spar terminal 54 depending upon the size of the gaps, and the dimensions of the shims 72, the angle of incidence 64 of the wing assembly 24 may be adjusted.

Figure 9:
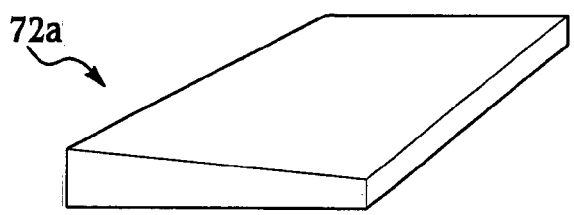
FIG. 9 is a perspective illustration of an alternate form of a shim.

Although flat, rectangularly shaped shims 72 are often used in fitting and joining aircraft assemblies, the shims 72 may be of any various profiles, shapes and dimensions. For example, as shown in FIG. 9, a shim 72a is rectangularly shaped in footprint, but is wedge shaped in cross section.

Figure 10:
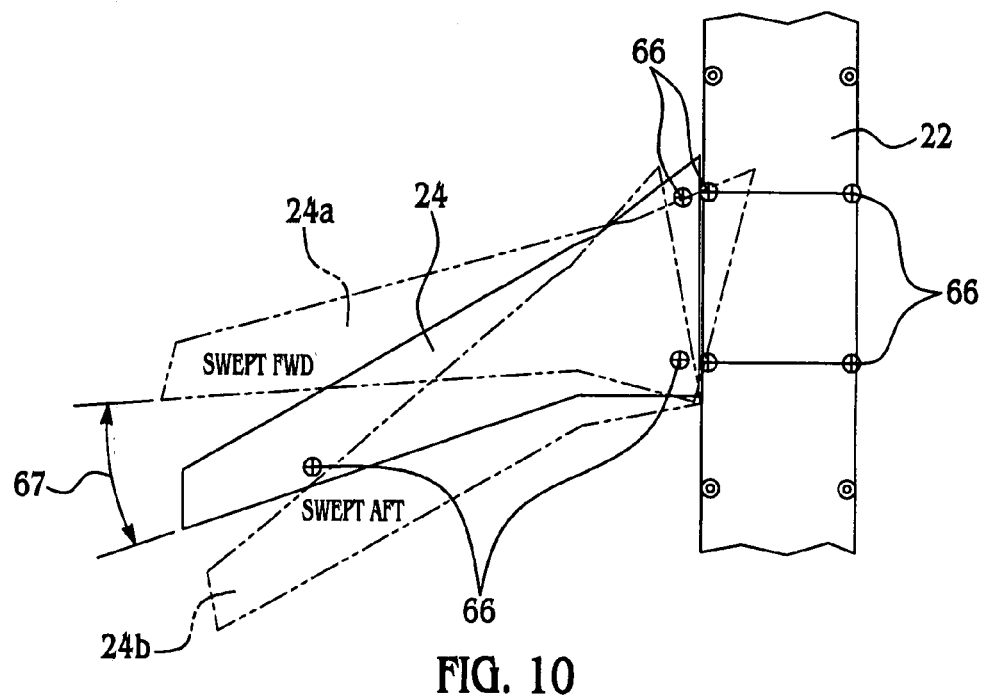
FIG. 10 is a plan view illustration showing a potential range of adjustment in the sweep angle of a wing using shims.

FIG. 10 shows a port wing assembly in various angles of sweep 67. The sweep angle 67, which is determined by measurement of reference points 66, can be adjusted using the shims 72, with the thickness of the shim 72 affecting the sweep angle 67.

Figure 11:
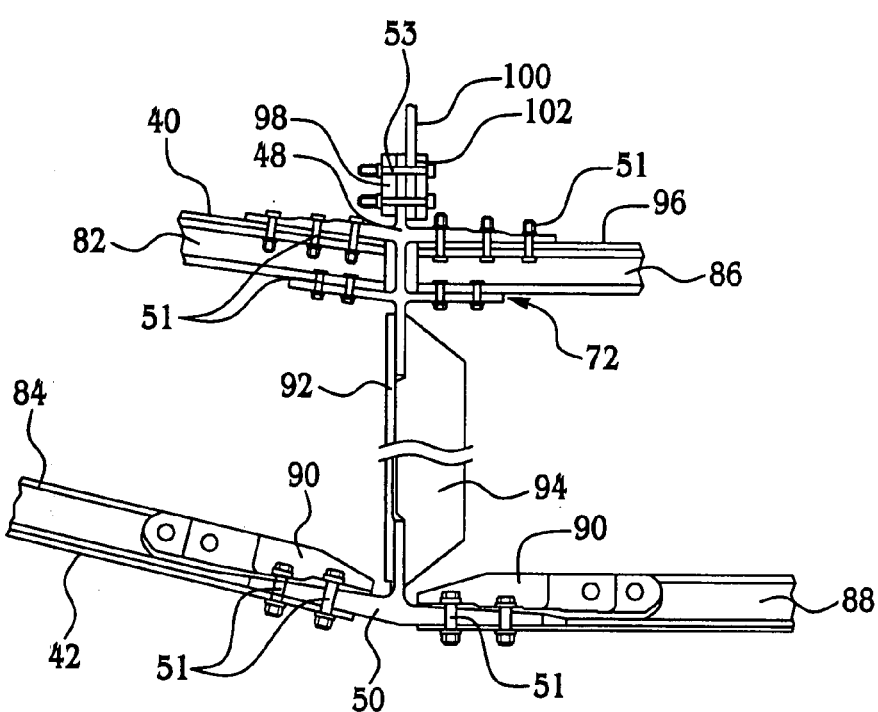
FIG. 11 is a sectional illustration showing the attachment of a wing to the fuselage, and depicting the use of a shim.

FIG. 11 shows the use of a shim 72 for connecting the components of the wing assembly 24 with the fuselage 22. The wing assembly 24 is connected to the fuselage 22 using an upper, double plus chord 48 and a lower chord 50. Chords 48, 50 are connected together through a web 94 and stiffener 92. The wing assembly 24 includes upper and lower panel stringers 82, 84 respectively. The upper panel stringer 82, which is covered by panel 40, is secured to tabs on the upper chord 48 by means of fasteners 51. The lower panel stringer 84, which is covered by lower panel 42, is connected through paddle fittings 90 and fasteners 51 to a tab on the lower chord 50. The fuselage 22 includes upper and lower panel stringers 86, 88 respectively. The upper panel stringer 86 is secured by fasteners 51 to the upper chord 48. The lower panel stringer 88 is attached via a paddle fitting 90 and fasteners 51 to a tab on the lower chord 50. A tab on the upper double chord 48 is secured to a stringer 98 on the fuselage 22 by means of fasteners 53. A body skin 100 is also secured to a tab on the upper chord 48, and is reinforced by a strap 102.

Figure 12:
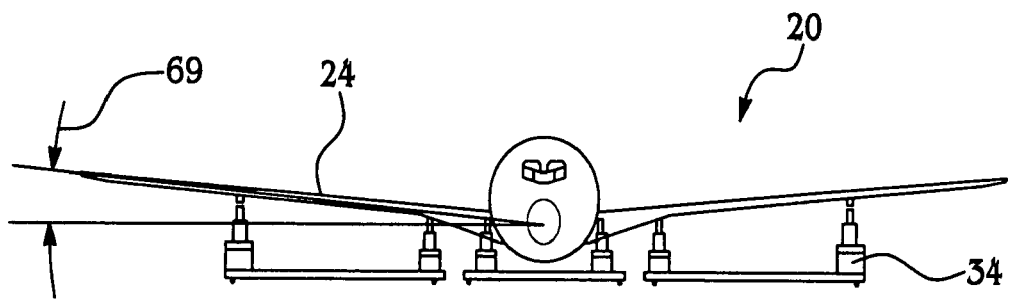
FIG. 12 is a frontal illustration of an aircraft, depicting the range of adjustment of the dihedral of the wings using shims.
Figure 13:
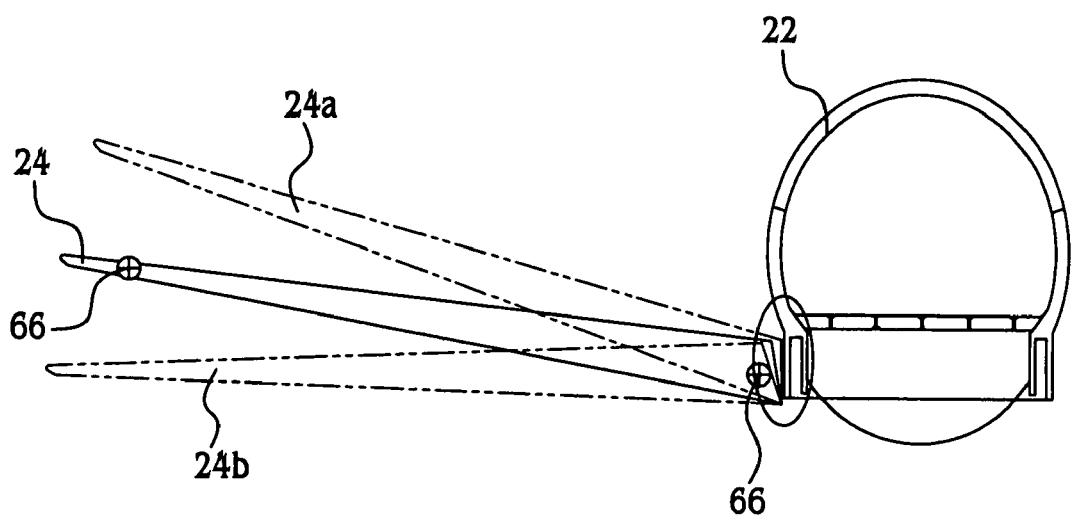
FIG. 13 is an enlarged illustration of a wing attached to a fuselage, showing alternate dihedral positions of the wing, and key reference points used to adjust the dihedral angle.

As shown in FIGS. 12 and 13, shims 72 can be used to adjust the dihedral angle 69. Three positions of the wing assembly are shown in FIG. 13, respectively designated by the numerals 24, 24a and 24b. The dihedral angle 69 is adjusted using a pair of reference points 66 which define the dihedral angle 69.

Figure 14:
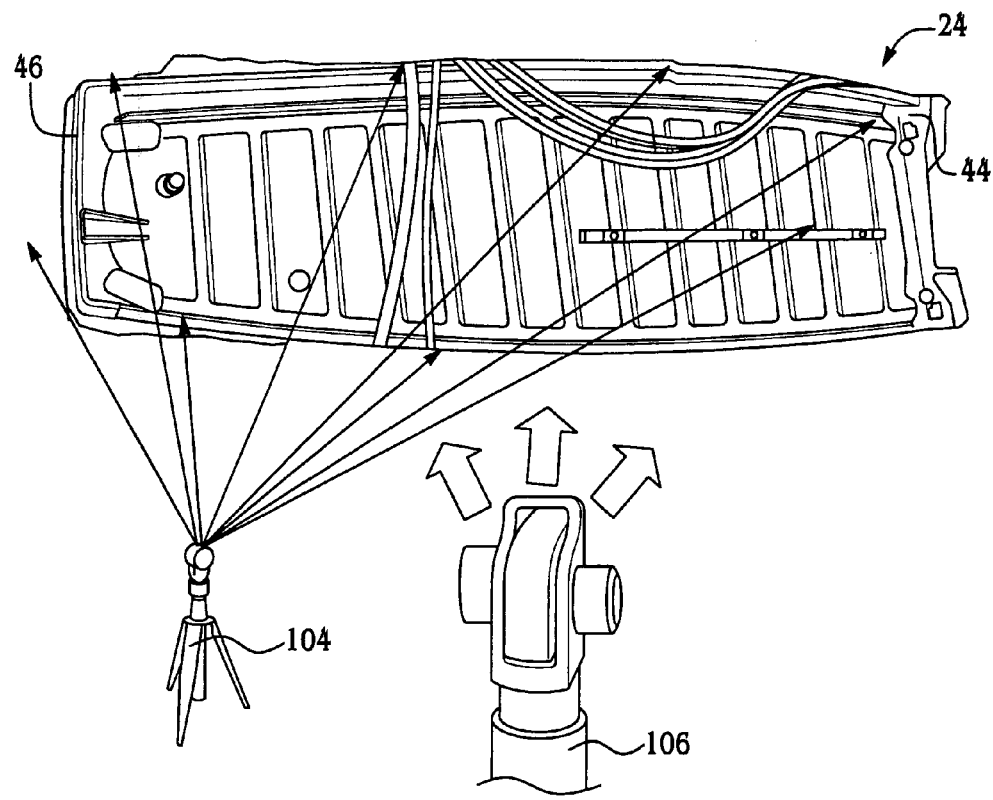
FIG. 14 is a perspective view of the inboard end of a wing and combined laser tracking/photogrammetry equipment used to survey the location of features on the wing.
Figure 15:
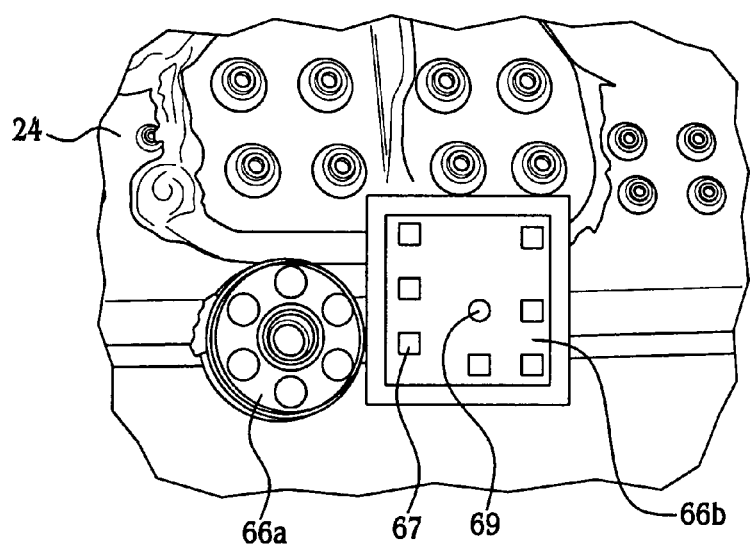
FIG. 15 is an enlarged illustration of a section of the wing shown in FIG. 14, better depicting two reflective targets used in the feature location survey process.

Attention is now directed to FIGS. 14 and 15 which depict the use of non-contact measuring equipment to measure the three dimensional position of parts or features of the wing assembly 24 as well as the fuselage 22. FIG. 14 depicts the use of both a laser tracker 104 and photogrammetry apparatus 106 for measuring features such as reference points 66 on the wing assembly 24. In the illustrated embodiment, a merged photogrammetry and laser tracking technique is used to determine the special location of laser targets such as targets 66a and 66b shown in FIG. 15. The two sets of measurement data generated by the laser tracker 104 and photogrammetry equipment 106 are loaded into a computer (not shown) and are combined using commercially available spatial analyzer software.

The merged laser tracker and photogrammetry technique mentioned above is described in more detail in U.S. patent application Ser. No. 11/518,471, filed Sep. 8, 2006, assigned to the Boeing Company, the entire contents of which are incorporated by reference herein. Some of the reflective targets such as target 66b shown in FIG. 15 may be coded, by uniquely arranging reflective squares and dots 69 which may be "read" by a computer to uniquely identify the position of the targets 66b. For example, the uniquely positioned targets 66b can be used to establish the position of the reference points 66 shown in FIGS. 6, 10 and 13. It should be noted here that although a merged laser tracker/photogrammetry technique has been illustrated to locate key features which determine the fit between the wing assembly 24 and the fuselage 22, a variety of other contact and non-contact technologies can be used to develop digital data sets representing the location of parts or features on the wing assembly 24 and the fuselage 22, in a common coordinate system.

Figure 16:
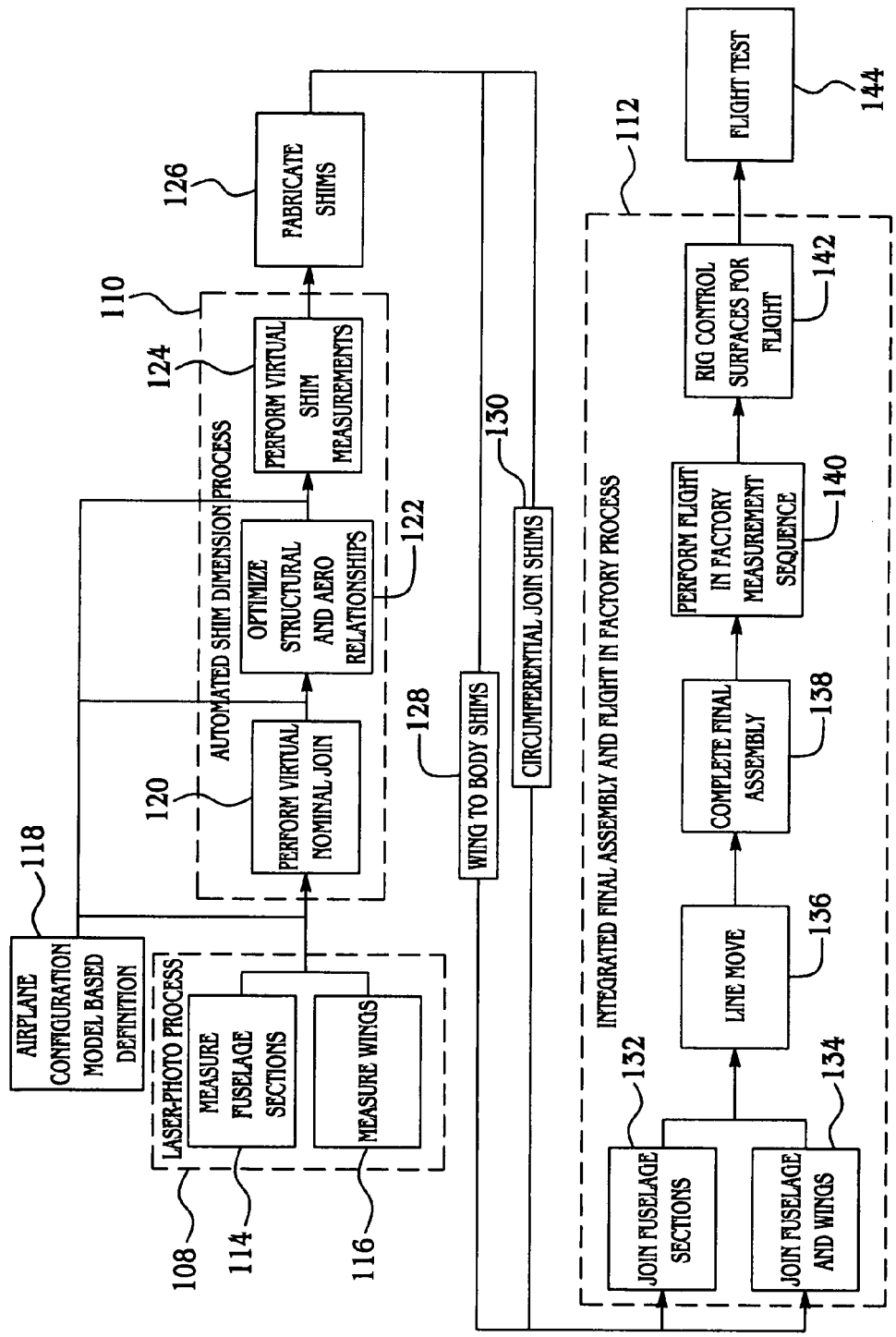
FIG. 16 is a block diagram of a process used to assemble an aircraft, including an automated shim dimension method.
Figure 17:
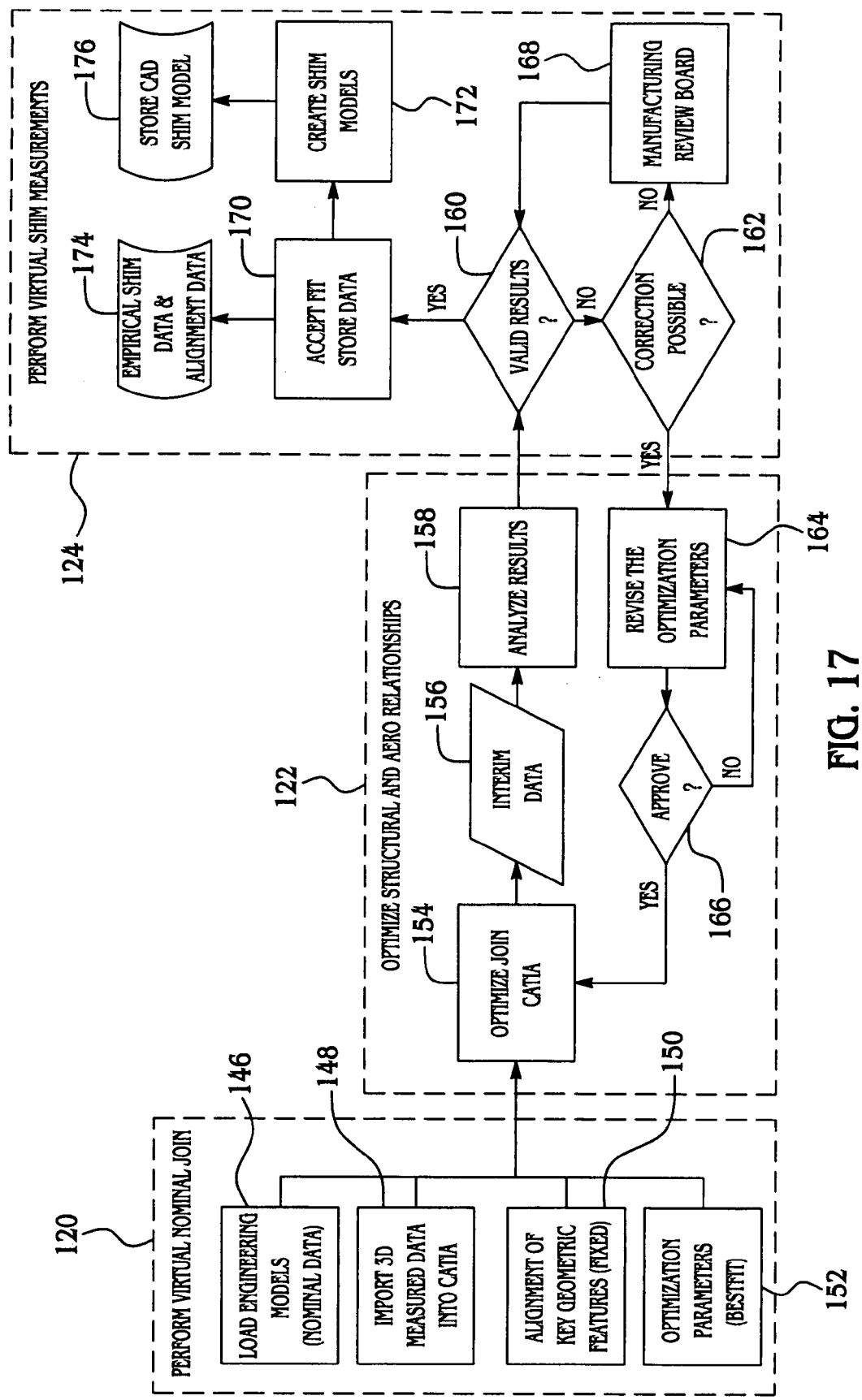
FIG. 17 is a simplified flow chart of a method and software used in the automated shim dimension process shown in FIG. 16.

Reference is now made to FIGS. 16 and 17 which depict the steps and related software flow charts for joining and fitting large complex part assemblies such as the previously described attachment of fuselage sections 22a, 22b and wing assemblies 24. As shown at 108, the laser/photogrammetry process 108 is used to measure the spatial position of the fuselage sections at 114 and the wing assembly 24 shown at 116. A set of data is generated that defines airplane configuration model based definition at 118. The configuration definition at 118 essentially comprises nominal design information for the aircraft including data which may include tolerances and ranges for key parameters, such as wing inclination, sweep and dihedral. The configuration definition data 118 is combined with the spatial position data generated at 118, and is used in an automated shim dimension process 110.

The shim dimension process 110 begins by performing a virtual nominal join at 120. The virtual join 120 essentially comprises an initial virtual fit between the assemblies to be joined, using the configuration definition data 118. Then, at step 122, the initial virtual join or fit performed at 120 is optimized, again using the configuration definition data 118. The optimization performed at 122 may include analyzing the structural and aerodynamic relationships between various assemblies on the aircraft so that flight performance is optimized within the airplane configuration definition 118. For example, the inclination, sweep and dihedral of the wing assembly 24 may be adjusted within certain ranges determined by the configuration definition 118 in order to optimize aircraft performance. Then, at step 124, virtual shim measurements are calculated to determine the size (dimensions) and shape of the shims required to fill voids or gaps between the assemblies, based on the optimized fit completed at step 122.

The details of the automated shim dimension process 110 are shown in FIG. 17. The virtual nominal join or fit process 120 requires the generation and loading of engineering models for the assembly fit, which comprises nominal fit data. The measurement data generated by the merged laser/photogrammetry process 108 (FIG. 16) is imported as three dimensional data into a CAD program such as CATIA at 148. The fitting process includes the alignment of key geographic features which are typically fixed at 150. The parameters used in the virtual join process are optimized at 152 in order to obtain a best fit. The preliminary, virtual nominal join or fit data is then used in a process for optimizing the structural and aero relationships at 122.

The preliminary virtual fit is initially optimized using the configuration definition data 118 (FIG. 16), resulting in a set of interim data 156 that is then analyzed at 158. At 160, a determination is made of whether the analyzed results are valid. If the results are valid, the purposed fit is accepted and data representing this fit is stored at 170. However, if the analyzed results are not valid, a determination is made at step 162 of whether the fit may be corrected. If the fit is not correctable, the fit results may be referred to an authority for determining corrective action, such as the manufacturing review board 168. However, if the results appear to be correctable, the optimization parameters are revised at step 164 and a determination is made at 166 whether to approve the revised optimization parameters. If approval is obtained at step 166, the optimization of the fit is repeated at step 154 using revised optimization parameters.

When the fit is accepted at step 170, a set of data is developed and stored at step 174 comprising empirical shim data and alignment data. The data developed at step 174 may be used in improving the process for generating shim dimensions for future assemblies, and to alter manufacturing processes used to produce subsequent part assemblies so as to reduce the size or number of gaps and potentially eliminate the gaps, thus eliminating the need for shims. The accepted fit data is used to create shim models at 172 which may be stored as CAD shim models at 176. The shim models 176 may be automatically delivered as digital data files to equipment (not shown) such as a CNC machining center which automatically machines the shims 72 to the dimensions which fill gaps based on the accepted fit at 170.

Figure 18:
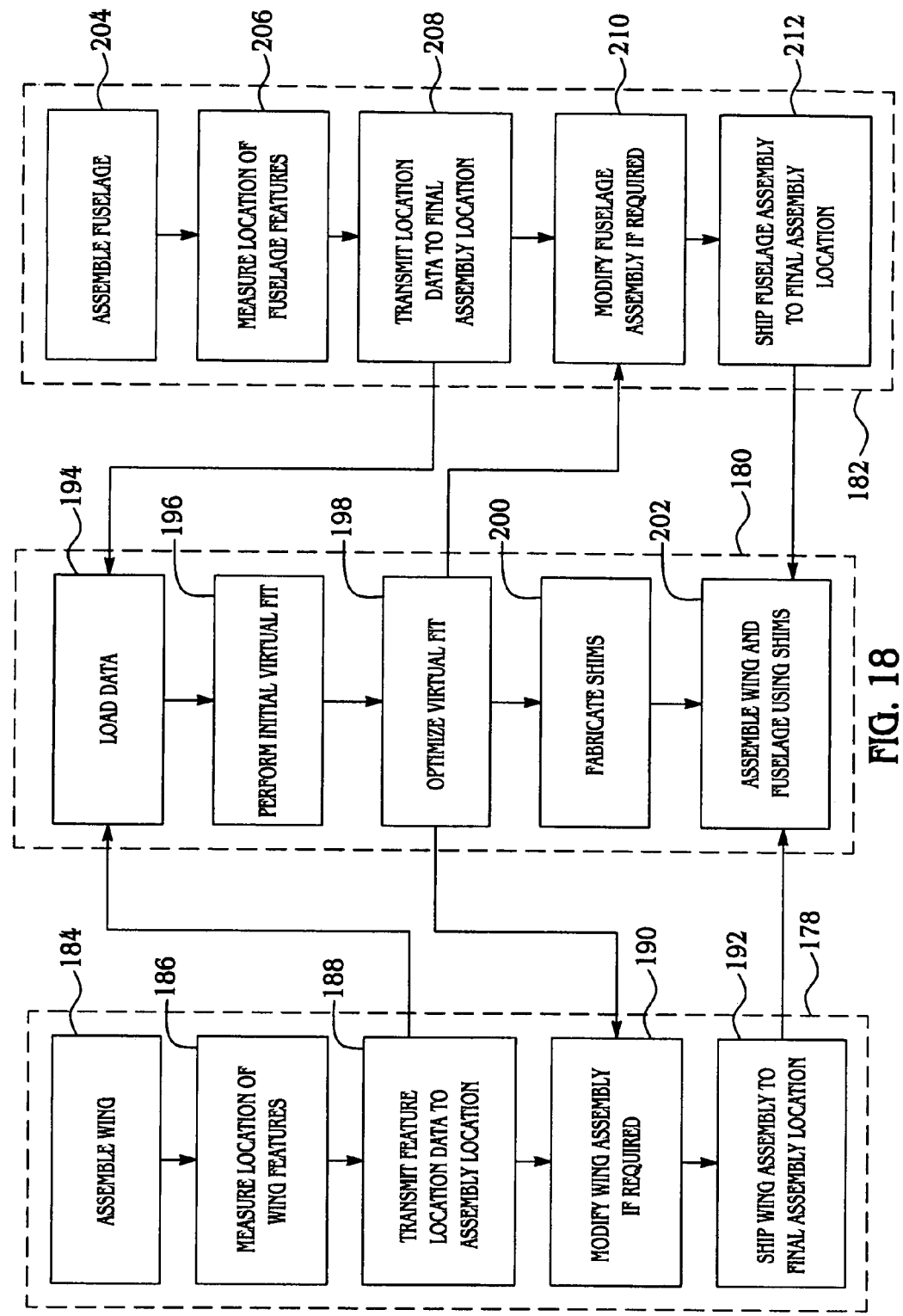
FIG. 18 is a flow diagram of a method for assembling an aircraft in which part assemblies are fabricated in differing geographic locations.

Attention is now directed to FIG. 18 which depicts the steps of fitting and assembling wing and fuselage assemblies that have been fabricated in different geographic locations. The wing is assembled at step 184, following which a survey is performed to measure the location of features on the assembled wing at 186, using, for example, the merged laser tracker photogrammetry technique described earlier. At step 188, the feature location data is transmitted to a second geographical location 180 where this, along with other data relating to the location of features on the fuselage, nominal engineering data, etc are loaded at 194. An initial virtual fit is performed at 196, following which the virtual fit is optimized at 198, as described earlier. The optimized virtual fit data is transmitted back to the first geographic location 178 where modifications to the wing assembly are carried out, if required. At step 92, the wing assembly is shipped to the final assembly location 180.

At a second geographic location 182, the fuselage is assembled at step 204, following which a survey is made to; measure the location of fuselage features at 206 using the previously described laser tracker/photogrammetry techniques. At step 208, the surveyed location data is transmitted to the final assembly location 180 and is used as part of the data loaded at 194 employed to carry out the initial virtual fit at 196. The optimized virtual fit information is transmitted back to the fuselage assembly location 182 where it is used to carry out any modification of the fuselage, if required. At step 212, the fuselage assembly is shipped to the final assembly location 180 based on the optimized virtual fit at 198, shims are fabricated at step 200 which are then used to assemble the wing and fuselage at step 202.

From the above, it may be appreciated that large, complex assemblies such as the wings and fuselage of an aircraft may be fabricated at different manufacturing sites, and that the shims required to fit and join these assemblies can be fabricated in advance of the arrival of the subassemblies at the final assembly site 180. Thus, measurements and the generation of shim data need not be delayed until the assemblies can be physically fitted to determine the size and location of gaps and voids which need to be shimmed. Instead, the generation of an optimized, virtual fit between the assemblies allows the shims to be dimensioned and fabricated so as to carry out just-in-time assembly at the final assembly location 180. It should be noted here that although performing the steps of loading the data 194, performing the virtual fit 196 and optimizing the fit at 198 have been indicated as being carried out at the final assembly site 180, these steps may be performed at any location, in which case the final shim dimensions are delivered to the final assembly site 180 where the shims are fabricated at step 200.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fitting two parts together, comprising the steps of:
    (A) measuring the location of a first set of features of a first part;
    (B) measuring the location of a second set of features on a second part;
    (C) generating a virtual fit between the first and second parts based on the location measurements made in steps (A) and (B); and,
    (D) generating dimensions of shims to be positioned between the first and second parts based on the virtual fit generated in step (C).

2. The method of claim 1, wherein:
    step (A) includes recording the spatial locations of each of the features in the first set of features, and
    step (B) includes recording the spatial locations of each of the features in the second set of features.

3. The method of claim 1, wherein steps (A) and (B) are performed using laser tracking and photogrammetry.

4. The method of claim 1, wherein at least one of steps (A) and (B) are performed by:
    generating a first set of feature position data using laser tracking,
    generating a second set of feature position data using photogrammetry, and producing a third set of feature position data by combining the first and second sets of feature position data.

5. The method of claim 1, wherein step (C) includes comparing the locations measured in steps (A) and (B) with a set of nominal feature locations.

6. The method of claim 1, wherein step (C) includes:
performing a virtual nominal fit based on a set of data representing a nominal fit, and
optimizing the virtual nominal fit.

7. The method of claim 1, wherein step (C) includes:
generating computer models of the first and second parts using the location measurements made in steps (A) and (B), and
comparing the computer models.

8. The method of claim 1, wherein step (C) is performed automatically using a programmed computer.

9. A method of producing shims used in fitting aircraft part assemblies together, comprising the steps of:
(A) generating first and second sets of data respectively representing the location of features on first and second part assemblies;
(B) performing a virtual fit between the first and second part assemblies using the first and second sets of data;
(C) analyzing characteristics of the aircraft based on the virtual fit performed in step (B);
(D) modifying the virtual fit based on the results of step (C);
(E) generating the dimensions of at least one shim based on the modified virtual fit; and,
(F) fabricating the shim using the dimensions generated in step (E).

10. The method of claim 9, wherein step (A) includes measuring the locations of the features by a merged noncontact measurement process using laser tracking and photogrammetry.

11. The method of claim 9, wherein one of the part assemblies is a wing, and the characteristics analyzed in step (C) include at least one of—
the angle of incidence of the wing,
the sweep angle of the wing,
the dihedral of the wing.

12. The method of claim 9, wherein the characteristics analyzed in step (C) include the attitude of at least one of the part assemblies relative to the flow of air over the aircraft.

13. The method of claim 9, wherein:
step (E) includes generating a set of digital data representing the dimensions of the shim, and
step (F) includes using the set of digital data to control a machine used to fabricate the shim.

14. The method of claim 9, wherein step (B) includes:
providing a set of data representing a nominal fit between the first and second part assemblies and including key geometric features of the first and second part assemblies, and
aligning the key geometric features of the first and second part assemblies.

15. The method of claim 9, wherein step (B) includes:
aligning the features in a first set of features on the first and second part assemblies, and
performing a best fit between features in a second set of features on the first and second part assemblies.

16. The method of claim 9, further comprising the step of:
(G) providing a set of data representing a nominal fit between the first and second part assemblies.

17. A method of manufacturing an aircraft, comprising the steps of:

(A) manufacturing a first part assembly;
(B) generating a first set of data representing the position of features on the first part assembly;
(C) manufacturing a second part assembly;
(D) generating a second set of data representing the position of features on the second part assembly;
(E) performing a virtual fit between the first and second part assemblies using the first and second sets of data;
(F) generating the dimensions of shims used to fit the first and second parts assemblies together based on the virtual fit performed in step (E);
(G) fabricating shims based on the dimensions generated in step (F); and,
(H) assembling the first and second part assemblies using the shims fabricated in step (G).

18. The method of claim 17, wherein:
steps (A) and (B) are performed in a first geographic location,
steps (C) and (D) are performed in a second geographic location, and
step (H) is performed in a third geographic location.

19. The method of claim 17, wherein steps (B) and (D) each include performing non-contact measurement of the location of the features.

20. The method of claim 17, further comprising the steps of:
(I) analyzing characteristics of the aircraft based on the virtual fit performed in step (E); and,
(J) modifying the virtual fit based on the results of step (I).

21. The method of claim 17, wherein step (E) includes:
providing a set of data representing a nominal fit between the first and second part assemblies, the data including key geometric features of the first and second part assemblies, and
aligning the key geometric features of the first and second part assemblies.

22. The method of claim 17, wherein step (E) includes:
aligning the features in a first set of features on the first and second part assemblies, and
performing a best fit between features in a second set of features on the first and second part assemblies.

23. The method of claim 17, further comprising the step of:
(I) providing a set of data representing a nominal fit between the first and second part assemblies.

24. A method of manufacturing an aircraft, comprising the steps of:
(A) fabricating a first part assembly in a first manufacturing process;
(B) generating a first set of data representing the position of features on the first part assembly;
(C) fabricating a second part assembly in a second manufacturing process;
(D) generating a second set of data representing the position of features on the second part assembly;
(E) performing a virtual fit between the first and second part assemblies using the first and second sets of data;
(F) analyzing characteristics of the aircraft based on the virtual fit performed in step (E);
(G) modifying the virtual fit based on the results of step (F); and,
(H) altering at least one of the first and second manufacturing processes based on the results of the modified virtual fit.

25. The method of claim 24, wherein:
steps (A) and (B) are performed in a first geographic location, and steps (C) and (D) are performed in a second geographic location.

26. The method of claim 25, further comprising the step of:
(I) assembling the first and second part assemblies in a third geographic location.

27. The method of claim 24, wherein steps (B) and (D) each include performing non-contact measurement of the location of the features.

28. The method of claim 24, further comprising the steps of:
(I) analyzing characteristics of the aircraft based on the virtual fit performed in step (E); and,
(J) modifying the virtual fit based on the results of step (I).

29. The method of claim 24, wherein step (E) includes:
providing a set of data representing a nominal fit between the first and second part assemblies, the data including key geometric features of the first and second part assemblies, and
aligning the key geometric features of the first and second part assemblies.

30. The method of claim 24, wherein step (E) includes:
aligning the features in a first set of features on the first and second part assemblies, and
performing a best fit between features in a second set of features on the first and second part assemblies.

* * * * *